US010067531B2

(12) United States Patent
Maufort et al.

(10) Patent No.: US 10,067,531 B2
(45) Date of Patent: Sep. 4, 2018

(54) SYSTEMS, METHODS, AND DEVICES FOR WIRELESS GIGABIT (WIGIG) COMPUTING

(71) Applicant: JPMorgan Chase Bank, N.A., New York, NY (US)

(72) Inventors: Rocky J. Maufort, West Chester, PA (US); Joseph B. Nolan, Granville, OH (US)

(73) Assignee: JPMorgan Chase Bank, N.A., New York, NY (US)

(*) Notice: Subject to any disclaimer, the term of this patent is extended or adjusted under 35 U.S.C. 154(b) by 0 days.

(21) Appl. No.: 15/648,156

(22) Filed: Jul. 12, 2017

(65) Prior Publication Data
US 2018/0136693 A1    May 17, 2018

Related U.S. Application Data

(60) Provisional application No. 62/361,145, filed on Jul. 12, 2016.

(51) Int. Cl.
G06F 1/16       (2006.01)
G06F 3/14       (2006.01)
H04W 84/12      (2009.01)

(52) U.S. Cl.
CPC ............ G06F 1/163 (2013.01); G06F 1/1613 (2013.01); G06F 3/14 (2013.01); H04W 84/12 (2013.01)

(58) Field of Classification Search
CPC .......... G06F 1/163; G06F 1/1613; G06F 3/14; H04W 84/12; H04W 12/08; H04W 12/02; H04L 63/0853; H04L 63/107; H04B 1/385

(Continued)

(56) References Cited

U.S. PATENT DOCUMENTS 9,612,845 B2 *  4/2017  Switzer ............... G06F 9/4401
9,674,707 B2 *  6/2017  Boettcher ............ H04W 12/08
(Continued)

FOREIGN PATENT DOCUMENTS

WO    WO 2015/173653    11/2015

OTHER PUBLICATIONS

PCT International Search Report and Written Opinion, International Application No. PCT/US17/41657, dated Oct. 10, 2017, pp. 1-9.

Primary Examiner — Ali Neyzari
(74) Attorney, Agent, or Firm — Hunton Andrews Kurth LLP

(57) ABSTRACT

Systems, methods, and devices for WiGig computing are disclosed. In one embodiment, a system may include a wearable computing device having a computer processor, a first WiGig interface, and a sensor that senses whether the wearable computing device is being worn by a user. The sensor either enables the WiGig interface when it senses that the wearable computing device is being worn, or disables the WiGig interface when it senses that the wearable computing device is not being worn. The system may also include a display device having a display, a second WiGig interface, and a human interface device that receives a human input. The wearable computing device transmits display data to the display device using a WiGig communication network, and receives human input data from the display device using the WiGig communication network so that the wearable computing device functions as a central processing unit for the display device.

20 Claims, 2 Drawing Sheets

(58) Field of Classification Search
USPC .......................................... 340/4.12; 455/419
See application file for complete search history.

(56) References Cited

U.S. PATENT DOCUMENTS

| | | | |
|---|---|---|---|
| 2012/0206335 A1* | 8/2012 | Osterhout | G02B 27/0093 345/156 |
| 2015/0006870 A1 | 1/2015 | Switzer et al. | |
| 2016/0037345 A1 | 2/2016 | Margadoudakis | |
| 2017/0303129 A1* | 10/2017 | Boettcher | H04W 12/08 |

* cited by examiner

SYSTEMS, METHODS, AND DEVICES FOR WIRELESS GIGABIT (WIGIG) COMPUTING

RELATED APPLICATIONS

This application claims priority to U.S. Provisional Patent Application Ser. No. 62/361,145, filed Jul. 12, 2016, the disclosure of which is hereby incorporated by reference in its entirety.

BACKGROUND OF THE INVENTION

1. Field of the Invention

The present disclosure generally relates to systems, methods, and devices for WiGig computing.

2. Description of the Related Art

Embracing mobile computing in a brick and mortar remote location is challenging due to the inability to fully secure mobile devices (e.g., tablets, wireless form factor computers, etc.) and their content, as well as access to those devices over wireless networking. Conventional approaches include encryption, biometric authentication, etc. These approaches, however, still have vulnerabilities, including the loss of a physical device and/or personal identifiable information ("PII"), and access to networks or systems.

SUMMARY OF THE INVENTION

Systems, methods, and devices for WiGig computing are disclosed. In one embodiment, a system for wireless computing may include a wearable computing device having a computer processor, a first WiGig interface, and a sensor that senses whether the wearable computing device is being worn by a user. The sensor either enables the WiGig interface when it senses that the wearable computing device is being worn, or disables the WiGig interface when it senses that the wearable computing device is not being worn. The system may also include a display device having a display, a second WiGig interface, and a human interface device that receives a human input. The wearable computing device transmits display data to the display device using a WiGig communication network, and receives human input data from the display device using the WiGig communication network so that the wearable computing device functions as a central processing unit for the display device.

In one embodiment, the sensor may be a biometric sensor.

In one embodiment, the wearable computing device may also include a band having a clasp, and the sensor detects whether the clasp is open or closed.

In one embodiment, the human interface device may include a touch-sensitive input. In one embodiment, the touch sensitive-input may be a touch-sensitive screen.

In one embodiment, the human interface device may include an image capture device.

In one embodiment, the display device may be part of a tablet computer.

According to another embodiment, methods for wireless computing are disclosed. A wearable computing device comprising a first computer processor, a first WiGig interface, and a sensor that senses whether the wearable computing device is being worn may (1) determine that the wearable computing device is being worn by a user; and (2) establish a two-way WiGig communication with a display device comprising a display, a second WiGig interface, and a human interface device that receives human input. The wearable computing device may transmit display data to the display device using a WiGig communication network, and receive human input data from the display device using the WiGig communication network so that the wearable computing device functions as a central processing unit for the display device.

In one embodiment, the step of establishing the two-way WiGig communication with the display device may include the wearable computing device receiving an identifier for the display device. The identifier may include a machine-readable code, an alphanumeric code, etc.

In another embodiment, the step of establishing the two-way WiGig communication with the display device may include the wearable computing device displaying an identifier for the display device. The identifier may include a machine-readable code, an alphanumeric code, etc.

In one embodiment, the method may further include disabling the first WiGig interface in response to the sensor detecting that the wearable computing device is not being worn by the user.

In one embodiment, the sensor may include a biometric sensor.

In one embodiment, the wearable computing device may also include a band having a clasp, and the sensor detects whether the clasp is open or closed.

In one embodiment, the human interface device may include a touch-sensitive input, and the touch sensitive-input may be a touch-sensitive screen.

In one embodiment, the human interface device may include an image capture device.

In one embodiment, the display device may be part of a tablet computer.

According other embodiments, wearable computing devices are disclosed. In one embodiment, a wearable computing device may include a computer processor; a first WiGig interface; and a sensor that senses whether the wearable computing device is being worn by a user, wherein the sensor either enables the WiGig interface when it senses that the wearable computing device is being worn, or disables the WiGig interface when it senses that the wearable computing device is not being worn.

In one embodiment, the sensor may be a biometric sensor.

In one embodiment, the wearable computing device may also include a band having a clasp, and the sensor detects whether the clasp is open or closed.

In one embodiment, the wearable computing device may interact with a display device having a display, a second WiGig interface, and a human interface device that receives a human input. The wearable computing device may transmit display data to the display device using a WiGig communication network, and may receive human input data from the display device using the WiGig communication network so that the wearable computing device functions as a central processing unit for the display device.

In one embodiment, the human interface device may include a touch-sensitive input. In one embodiment, the touch sensitive-input may be a touch-sensitive screen.

In one embodiment, the human interface device may include an image capture device.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein related to systems and methods for computing involving Wireless Gigabit ("WiGig"). WiGig is a 60-GHz wireless networking technology that delivers multi-gigabit speeds over a short range. WiGig permits the seamless streaming of two-way video and interaction.

Although this disclosure is made in the context of WiGig, it should be recognized that other WiFi speeds may be used as necessary and/or desired so long as the speed is sufficient to support the two-way communication between a wireless computing device and a display device.

Figure 1:
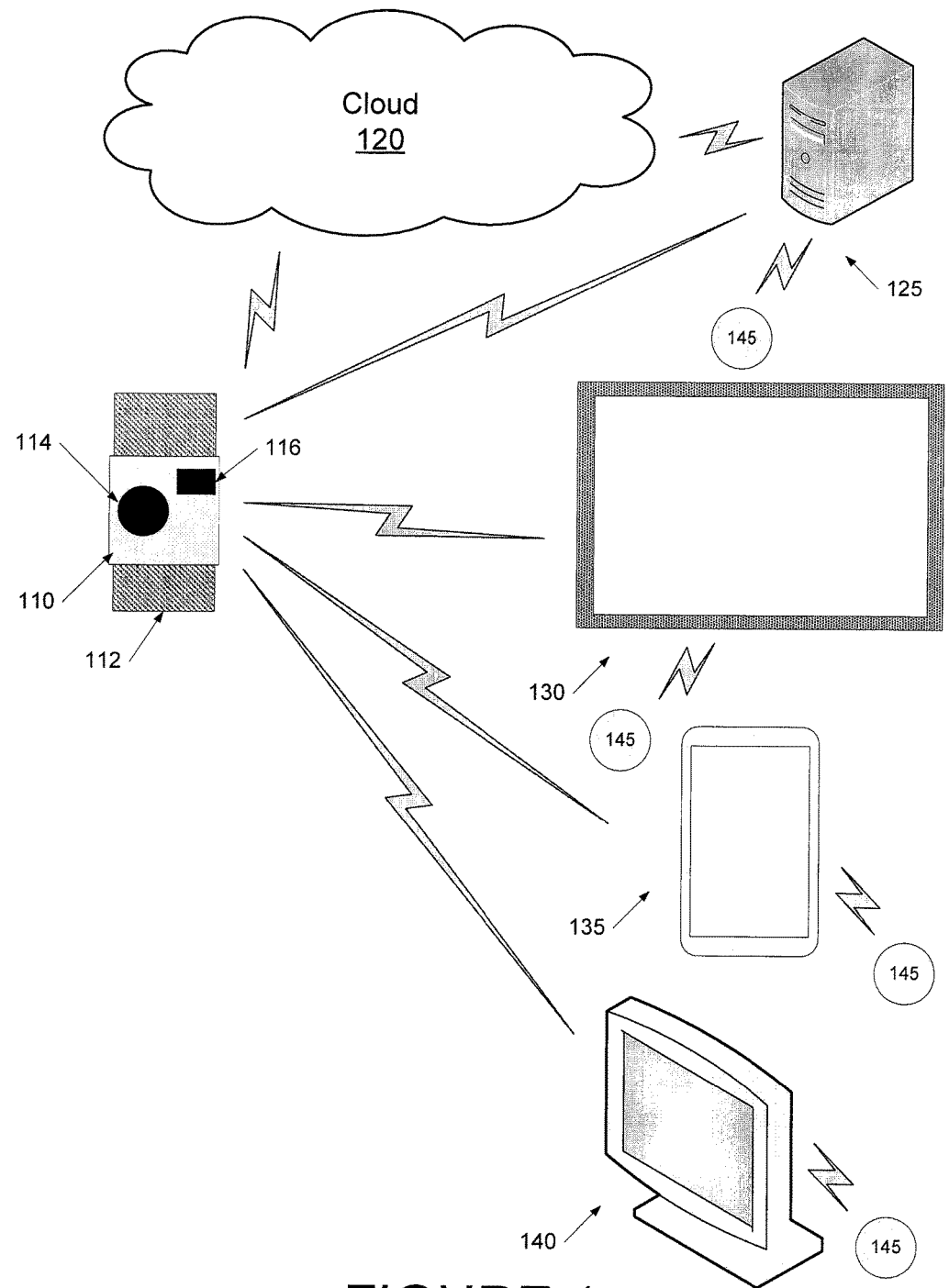
FIG. 1 depicts a system for WiGig computing according to one embodiment.

Referring to FIG. 1, a WiGig computing system is illustrated according to one embodiment. System 100 may include WiGig computing device 110 that may be worn by a user. For example, WiGig computing device 110 may be provided with wrist band 112 for wearing on the user's wrist. WiGig computing device may be worn at other positions, or may be physically carried by a user, as is necessary and/or desired.

In one embodiment, WiGig computing device may comprise a portable electronic device that may be carried by a user. In one embodiment, it may sense a proximity to a card, badge, etc. that that may be carried by a user.

In one embodiment, WiGig computing device 110 may be a microprocessor-based device and may include a microprocessor (CPU), memory, and at least one wireless interface 116. WiGig computing device 110 may further include one or more sensors 114, such as a biometric sensor, that may be used to determine if WiGig computing device 110 is being worn, or has been removed from the a body.

Any suitable securing device in addition to, or in place of, wrist band 112 may be used as is necessary and/or desired. Similarly, other sensing devices may be used as is necessary and/or desired.

In one embodiment, wireless interface 116 may be disabled when sensor 114 senses that WiGig computing device is not being worn, has been removed, is being worn by a different person, etc. Alternately, wireless interface 116 may be enabled when sensor 114 senses that WiGig computing device is being worn.

Any other suitable manner of enabling or disabling communications from and/or to WiGig computing device 110 when WiGig computing device 110 is not being worn may be used as is necessary and/or desired.

In one embodiment, WiGig computing device 110 may include a display (not shown). For example, WiGig computing device 110 may display a code or other identifier that may be used to pair WiGig computing device 110 with an external device, such as display 130, tablet computer, 135, terminal 140, or any other device as is necessary and/or desired.

In one embodiment, interface 116 may be a WiGig interface that may communicate with, for example, cloud 120 (e.g., cloud computing, cloud memory, etc.), server 125, display 130, tablet 135, terminal 140, etc.

In one embodiment, display 130, tablet 135, and/or terminal 140 may comprise a computer processor (e.g., a microprocessor, a micro-controllers, ASIC, etc.) (not shown) that may control the display. Display 130, tablet 135, and/or terminal 140 may further comprise a wireless interface (not shown) for communicating with WiGig computing device, cloud 120, and/or server 125.

In one embodiment, the controller and/or wireless interface may be provided as a separate device for display 130, tablet 135, and/or terminal 140.

In one embodiment, display 130, tablet 135, and/or terminal 140 may be "dumb" devices that primarily function to display information provided from WiGig computing device 110, and receive input information from one or more human interface devices 145 (e.g., keyboard, mouse, touchpad, image capture device, etc.) to communicate to WiGig computing device 110. In one embodiment, human interface devices 145 may interface with display 130, tablet 135, and/or terminal 140 by wires, wirelessly (e.g., Bluetooth, IR, NFC), etc. Display 130, tablet 135, and/or terminal 140 may provide data from human interface device 145 to WiGig computing device 110 using WiGig communications.

In another embodiment, human interface devices 145 may interface directly with WiGig computing device 110 wirelessly, using, for example, Bluetooth, NFC, etc.

In one embodiment, display 130, tablet 135, and/or terminal 140 may not store any data, thereby mitigating the risk of the loss of PII should any of these devices lost, stolen, or otherwise compromised. For example, display 130, tablet 135, and/or terminal 140 may store data from WiGig computing device 110 and/or human interface device 145 in volatile memory only. In one embodiment, when WiGig computing device 110 is disconnected from display 130, tablet 135, and/or terminal 140, the volatile memory of display 130, tablet 135, and/or terminal 140 may be cleared by wiping the memory, power cycling display 130, tablet 135, and/or terminal 140, etc.

In one embodiment, the combination of WiGig computing device 110 with any of display 130, tablet 135, and/or terminal 140 and human interface device(s) 145 may function as a stand-alone computing device. For example, WiGig computing device 110 may serve as the "computer" for any of display 130, tablet 135, and/or terminal 140, such that when WiGig computing device 110 is within range of display 130, tablet 135, and/or terminal 140, the devices function together in a manner that is similar to a desktop, notebook, or tablet computer.

In one embodiment, WiGig computing device 110 and display 130, tablet 135, and/or terminal 140 may communicate using WiGig communications. In one embodiment, the WiGig communications may be bi-directional-data from WiGig computing device 110 (e.g., data to display for the user) may be communicated to display 130, tablet 135, and/or terminal 140, and data from display 130, tablet 135, and/or terminal 140 (e.g., data from human interface device 145) may be communicated to WiGig computing device.

In one embodiment, when WiGig computing device 110 is separated from display 130, tablet 135, and/or terminal 140 by a sufficient distance, is manually disconnected, or has not been paired to display 130, tablet 135, and/or terminal 140, however, display 130, tablet 135, and/or terminal 140 may function as they would without being connected to WiGig computing device 110.

In one embodiment, WiGig computing device 110 may communicate with cloud 120, server 125, display 130, tablet 135, and/or terminal 140 by any other suitable communication protocol (e.g., WiFi, Bluetooth, NFC, etc.) when WiGig speed is not required.

In one embodiment, WiGig computing device 110 may communicate with another computing device (not shown) as necessary and/or desired. In one embodiment, two WiGig computing devices 110 may be required for a user to use one of display 130, tablet 135, or terminal 140. For example, in one embodiment, a second computing device (not shown), WiGig or otherwise, may authorize a user wearing WiGig computing device 110 to use WiGig computing device 110 with one of display 130, tablet 135, or terminal 140.

As noted above, WiGig computing device 110 may include sensor 114 that may determine when computing device has been removed from a user. For example, before using WiGig computing device 110, a user may be required to authenticate to WiGig computing device 110 and/or server 125. Any suitable authentication protocol and/or modality (e.g., biometric, userid/passcode, etc.) may be used as is necessary and/or desired.

In one embodiment, sensor 114 may sense whether WiGig computing device 110 is being worn by a person. For example, sensor 114 may detect a heart rate, pulse, temperature, movement, etc. that may be indicative of computing device being located on, or worn by, a human. When sensor 114 detects that it has been removed from a human (e.g., no heart rate/pulse sensed, change in temperature, etc.), authentication may be required before WiGig computing device 110 may be used.

In one embodiment, sensor 114 may detect when a clasp in wristband 112 is opened and closed, thereby indicating that WiGig computing device 110 may have been removed.

When a user with WiGig computing device 110 approaches, for example, terminal 140, WiGig computing device 110 and terminal 140 may communicate so that the combination may function as the user's computer. In one embodiment, a plurality of terminals 140 may be provided, and each user with WiGig computing device 110 may use a terminal 140 as if were the user's personal computer.

The combination of WiGig computing device 110 and tablet 135 may function in a similar manner.

In one embodiment, in addition to, or instead of, proximity, the user may be required to select display 130, tablet 135, or terminal 140 for WiGig computing device 110 to interface. For example, the user may provide a code (e.g., a PIN, a password, a randomly-generated number or string of characters, etc.), an identifier associated with WiGig computing device 110, etc. to display 130, tablet 135, or terminal 140. Alternatively, the user may provide a code (e.g., a PIN, a password, a randomly-generated number or string of characters, etc.), an identifier associated with display 130, tablet 135, or terminal 140 to WiGig computing device 110. Any suitable pairing protocol may be used as is necessary and/or desired.

In one embodiment, the user may authenticate with display 130, tablet 135, or terminal 140 before using display 130, tablet 135, or terminal 140.

In one embodiment, a user may select one of display 130, tablet 135, or terminal 140 that may be activated for another user, and the selected display 130, tablet 135, or terminal 140 may remain active while the other user uses display 130, tablet 135, or terminal 140.

In one embodiment, display 130, tablet 135, or terminal 140 may interact with a user differently depending on whether the user is in possession of WiGig computing device 110 (e.g., indicating that an authorized user is proximate to display 130, tablet 135, or terminal 140), or if another user is using display 130, tablet 135, or terminal 140 without WiGig computing device 110 being proximate to display 130, tablet 135, or terminal 140.

In one embodiment, in a retail environment, such as a bank, representatives may wear computing devices that may maintain PII and authentication requirements. This may reduce or eliminate the risk of WiGig computing device 110 being stolen or compromised as WiGig computing device 110 may not be provided to the customer. Instead, the customer may be provided with a "dumb" tablet 135, or other display 140 that is used to display WiGig computing device 110's content. Because dumb tablet 135 or display 140 may not do anything other than display the data from WiGig computing device 110, the risks of biometric authentication, loss of expensive devices, loss of PII, and risk of unauthorized access to restricted servers/applications are removed or greatly diminished.

In one embodiment, representatives may interact with customers by handing the customer the dumb tablet or display when needed, while still controlling the data/PII/datacenter-ingress-controls on the computing device. In one embodiment, because no additional authentication is needed to use the computing device, the customer experience is improved.

In one embodiment, other user devices may interact with computing device by other protocols, including Bluetooth and NFC.

Figure 2:
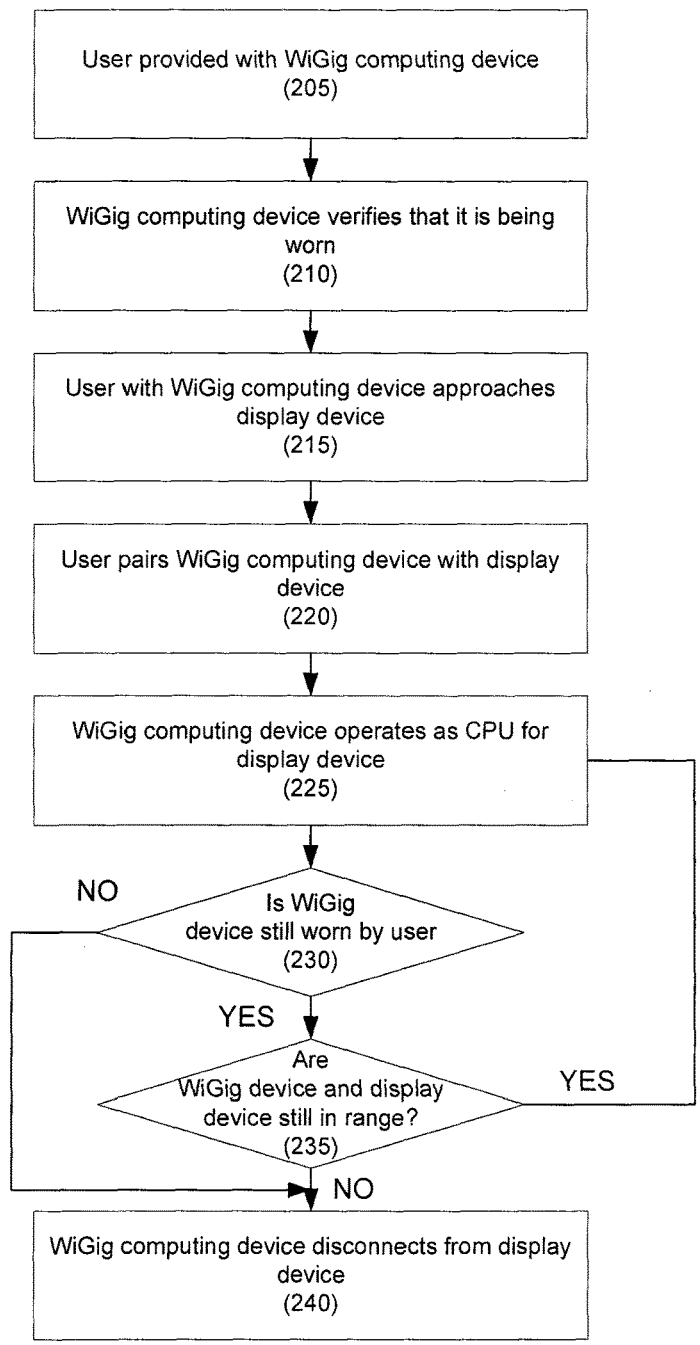
FIG. 2 depicts a method for WiGig computing according to one embodiment.

Referring to FIG. 2, a method for WiGig computing is provided according to one embodiment.

In step 205, a user may be provided with a WiGig computing device. In one embodiment, WiGig computing device may be a microprocessor-based device and may include a microprocessor (CPU), memory, and at least one wireless interface. It may further include one or more sensor that may determine whether or not the WiGig computing device is being worn by a human.

In one embodiment, WiGig computing device may worn by a user, and may be provided with a wrist band.

Next, in step 210, the WiGig computing device may verify that it is being worn by a human using, for example, the one or more sensors to sense a pulse, heartbeat, temperature, movement, etc. In addition, in one embodiment, a user may authenticate to WiGig computing device by providing a biometric sample (e.g., fingerprint, image scan, etc.) or by using a separate electronic device (e.g., a trusted smartphone).

In step 215, the user wearing the WiGig computing device may approach a display device that may provide a display for WiGig computing device, such as a display, a tablet, a terminal, a kiosk, etc. In one embodiment, one of WiGig computing device and the display device may recognize the presence of the other.

In step 220, the user may pair the WiGig computing device to the display device. In one embodiment, the user may enter a code provided by the WiGig computing device to the display device; in another embodiment, the user may provide a code provided by the display device to the WiGig computing device. In another embodiment, WiGig computing device may display a machine-readable code, or have a machine-readable code affixed thereto, and the display device may read this code to pair the devices using, for example, an image capture device. Any other suitable manner of paring WiGig computing device to the electronic device may be used as is necessary and/or desired.

In step 225, the user may interact with the display device using one or more human input devices (e.g., touchscreen, keyboard, mouse, touchpad, etc.). The WiGig computing device may provide the computing power (i.e., be the CPU) for the display device, and the display device may receive the user inputs and provide them to the WiGig computing device.

In step 230, the WiGig computing device may monitor sensor(s) to determine if it is still worn by the user. If it is not being worn by the user, in step 240, the WiGig computing device may disconnect from the display device. In another embodiment, WiGig computing device may require the user to authenticate once WiGig computing device senses that it is being worn again.

If the WiGig device senses that it is being worn, in step 235, the WiGig computing device and/or the display device may determine whether the WiGig computing device and the display device are within operating range of each other. In one embodiment, a radio signal strength indicator, or RSSI, may be used to determine the approximate distance between the WiGig computing device and the display device. An example of such is disclosed in U.S. Provisional Patent Application Ser. No. 62/353,848, the disclosure of which is hereby incorporated, by reference, in its entirety.

If the WiGig computing device and the display device are not within a predetermined distance, in step 240, the WiGig computing device may disconnect from the display device. In one embodiment, the volatile memory of the display device may be cleared.

In another embodiment, Light Fidelity ("Li-Fi") may be used permit access to different applications or network routing based on a person's location within an area. For example, in a retail banking environment, if a customer is with a banker at a kiosk, the banker may have access to customer information data. When at an ATM, the banker may be provided with access to authenticate and approve transactions. In an open area, however, the customer may only access to general branch information.

In one embodiment, LiFi may be used to provide different personas for an individual. For example, one or more LiFi transmitters may be positioned within, for example, a bank. When the user is near a transmitter, the user may be authenticated, and the applications associated with that area may be provided. For example, in a user's office, the office suite of applications may be provided. When interacting in a customer area, however, the customer-centric apps may be provided. Other personas, uses, etc. may be used as necessary and/or desired.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for wireless computing, comprising:
a wearable computing device comprising:
a computer processor;
a first WiGig interface; and
a sensor that senses whether the wearable computing device is being worn by a user, wherein the sensor either enables the WiGig interface when it senses that the wearable computing device is being worn, or disables the WiGig interface when it senses that the wearable computing device is not being worn; and
a display device comprising:
a display;
a second WiGig interface; and
a human interface device that receives a human input;
wherein the wearable computing device transmits display data to the display device using a WiGig communication network, and receives human input data from the display device using the WiGig communication network so that the wearable computing device functions as a central processing unit for the display device.

2. The system of claim 1, wherein the sensor comprises a biometric sensor.

3. The system of claim 1, wherein the wearable computing device further comprises a band comprising a clasp, and the sensor detects whether the clasp is open or closed.

4. The system of claim 1, wherein the human interface device comprises a touch-sensitive input.

5. The system of claim 4, wherein the touch sensitive-input comprises a touch-sensitive screen.

6. The system of claim 1, wherein the human interface device comprises an image capture device.

7. The system of claim 1, wherein the display device comprises a tablet computer.

8. A method for wireless computing, comprising:
a wearable computing device comprising a first computer processor, a first WiGig interface, and a sensor that senses whether the wearable computing device is being worn:
determining that the wearable computing device is being worn by a user;
establishing a two-way WiGig communication with a display device comprising a display, a second WiGig interface, and a human interface device that receives human input, wherein the wearable computing device transmits display data to the display device using a WiGig communication network, and receives human input data from the display device using the WiGig communication network so that the wearable computing device functions as a central processing unit for the display device.

9. The method of claim 8, wherein the step of establishing the two-way WiGig communication with the display device comprises:
the wearable computing device receiving an identifier for the display device.

10. The method of claim 9, wherein the identifier comprises a machine-readable code.

11. The method of claim 9, wherein the identifier comprises an alphanumeric code.

12. The method of claim 8, wherein the step of establishing the two-way WiGig communication with the display device comprises:
the wearable computing device displaying an identifier for the display device.

13. The method of claim 12, wherein the identifier comprises a machine-readable code.

14. The method of claim 12, wherein the identifier comprises an alphanumeric code.

15. The method of claim 8, further comprising:
disabling the first WiGig interface in response to the sensor detecting that the wearable computing device is not being worn by the user.

16. The method of claim 15, wherein the sensor comprises a biometric sensor.

17. The method of claim 15, wherein the wearable computing device further comprises a band comprising a clasp, and the sensor detects whether the clasp is open or closed.

18. The method of claim 8, wherein the human interface device comprises a touch-sensitive input, and the touch sensitive-input comprises a touch-sensitive screen.

19. The method of claim 8, wherein the human interface device comprises an image capture device.

20. The method of claim 8, wherein the display device comprises a tablet computer.

* * * * *